United States Patent
Baeck et al.

(10) Patent No.: US 11,791,491 B2
(45) Date of Patent: Oct. 17, 2023

(54) FUEL CELL

(71) Applicants: Hyundai Motor Company, Seoul (KR); Kia Motors Corporation, Seoul (KR)

(72) Inventors: Suk Min Baeck, Seongnam-si (KR); Yong Suk Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 180 days.

(21) Appl. No.: 17/158,190

(22) Filed: Jan. 26, 2021

(65) Prior Publication Data

US 2022/0077485 A1 Mar. 10, 2022

(30) Foreign Application Priority Data

Sep. 10, 2020 (KR) .................. 10-2020-0116068

(51) Int. Cl.
*H01M 8/248* (2016.01)
*H01M 8/0247* (2016.01)
*H01M 8/2475* (2016.01)

(52) U.S. Cl.
CPC ......... *H01M 8/248* (2013.01); *H01M 8/0247* (2013.01); *H01M 8/2475* (2013.01)

(58) Field of Classification Search
CPC .. H01M 8/248; H01M 8/0247; H01M 8/2475; H01M 8/2404; H01M 8/247; Y02E 60/50
See application file for complete search history.

(56) References Cited

U.S. PATENT DOCUMENTS

| | | | | |
|---|---|---|---|---|
| 5,486,430 A | * | 1/1996 | Gorbell | H01M 8/2465 429/469 |
| 2008/0220313 A1 | * | 9/2008 | Zerfass | H01M 8/2404 429/456 |
| 2008/0268319 A1 | * | 10/2008 | Sakano | H01M 8/2475 429/456 |
| 2013/0171545 A1 | * | 7/2013 | Betts | H01M 8/242 429/507 |
| 2022/0149418 A1 | * | 5/2022 | Harvey | H01M 8/248 |

FOREIGN PATENT DOCUMENTS

KR 100875579 B1 12/2008

* cited by examiner

*Primary Examiner* — Ula C Ruddock
*Assistant Examiner* — Sarika Gupta
(74) *Attorney, Agent, or Firm* — Slater Matsil, LLP

(57) ABSTRACT

A fuel cell includes a cell stack including a plurality of unit cells stacked in a first direction, a first end plate and a second end plate disposed at respective side ends of the cell stack, and an enclosure coupled to at least one of the first end plate or the second end plate to envelop a side portion of the cell stack, wherein an end portion of the enclosure comprises at least one protruding portion protruding toward the end plate to which the enclosure is coupled, among the first end plate and the second end plate, and wherein the end plate coupled to the enclosure comprises at least one receiving recess formed therein to receive the at least one protruding portion.

19 Claims, 17 Drawing Sheets

FUEL CELL

CROSS-REFERENCE TO RELATED APPLICATIONS

This application claims the benefit of Korean Patent Application No. 10-2020-0116068, filed on Sep. 10, 2020, which application is hereby incorporated herein by reference.

TECHNICAL FIELD

Embodiments relate to a fuel cell.

BACKGROUND

In general, a fuel cell includes a polymer electrolyte membrane, and generates electricity using air supplied to one surface of the membrane and hydrogen supplied to the opposite surface of the membrane. Such a fuel cell serves to supply electricity to a vehicle. There is the need to develop a fuel cell having a simple configuration.

SUMMARY

Accordingly, embodiments are directed to a fuel cell that substantially obviates one or more problems due to limitations and disadvantages of the related art.

Embodiments may provide a fuel cell having a simple configuration.

However, the objects to be accomplished by the embodiments are not limited to the above-mentioned objects, and other objects not mentioned herein will be clearly understood by those skilled in the art from the following description.

A fuel cell according to an embodiment may include a cell stack configured such that a plurality of unit cells is stacked in a first direction, first and second end plates are disposed at respective side ends of the cell stack, and an enclosure is coupled to at least one of the first end plate or the second end plate to envelop a side portion of the cell stack. An end portion of the enclosure may include at least one protruding portion protruding toward an end plate to which the enclosure is coupled, among the first end plate and the second end plate, and the end plate coupled to the end portion of the enclosure may include at least one receiving recess formed therein to receive the at least one protruding portion.

For example, the end portion of the enclosure may include a first end portion coupled to the first end plate and a second end portion coupled to the second end plate. The at least one protruding portion may include at least one of a first protruding portion protruding from the first end portion toward the first end plate or a second protruding portion protruding from the second end portion toward the second end plate. The at least one receiving recess may include at least one of a first receiving recess formed in the first end plate to receive the first protruding portion or a second receiving recess formed in the second end plate to receive the second protruding portion.

For example, the at least one protruding portion may protrude in a 'U' shape, and the at least one receiving recess may be concavely formed in a 'U' shape.

For example, the enclosure may be divided into a plurality of segments, and the at least one protruding portion may protrude from an end portion of at least one of the plurality of segments.

For example, the end portion of the enclosure may include first and second side portions disposed opposite each other in a second direction, intersecting the first direction, and an upper portion and a lower portion disposed opposite each other in a third direction, intersecting the first direction and the second direction. The at least one protruding portion may protrude from at least one of the upper portion, the lower portion, the first side portion, or the second side portion.

For example, the end plate coupled to the end portion of the enclosure may include an outer part and an inner part disposed between the outermost cell of the cell stack and the outer part, and the at least one receiving recess may be formed in the edge of the inner part.

For example, the length of the enclosure in the first direction may be less than an interval by which an inner surface of the outer part of the first end plate and an inner surface of the outer part of the second end plate are spaced apart from each other in the first direction.

For example, the fuel cell may further include an outer gasket disposed between the outer part and the enclosure in the first direction.

For example, the outer gasket may be disposed on an inner surface of the outer part that faces an outer surface of the enclosure in the first direction.

For example, the inner surface of the outer part may include a first recess formed therein to allow the outer gasket to be inserted thereinto.

For example, the outer gasket may be disposed on an outer surface of the enclosure that faces the inner surface of the outer part in the first direction.

For example, the outer surface of the enclosure may include a second recess formed therein to allow the outer gasket to be inserted thereinto.

For example, the outer gasket may be disposed in contact with the edge of the inner part. Alternatively, the outer gasket may be disposed so as to be spaced apart from the edge of the inner part.

For example, each of the outer part and the inner part may include metal, and the outer part and the inner part may be integrated.

For example, the outer part may include metal, and the inner part may include an insulating material.

For example, the outer part may include a body, which includes metal and includes an outer surface and an inner surface facing the inner part, and a shell, which is disposed on at least one of the outer surface or the inner surface of the body and is insulative. The outer gasket may be integrated with at least one of the shell or the inner part.

For example, the at least one protruding portion may include a conductive material, and the portion of the inner part in which the at least one receiving recess is formed may include an insulating material.

For example, the fuel cell may further include a fastener. The outer part may include a first coupling portion, the enclosure may include a second coupling portion configured to be engaged with the first coupling portion by the fastener, and the clamping force of the cell stack may be increased in the first direction by the engagement force of the first coupling portion and the second coupling portion.

For example, the outer part may include at least one guide support hole formed in the edge of the outer part so as to overlap the at least one receiving recess in the first direction.

For example, the at least one guide support hole may have a first width in the second direction, the at least one receiving recess may have a second width in the second direction, the at least one protruding portion may have a third width in the second direction, and the first to third widths may have relationships therebetween as follows:

$$W1<W2\leq W3.$$

Here, W1 represents the first width, W2 represents the second width, and W3 represents the third width.

For example, the at least one guide support hole may be located on an imaginary extension line extending in the first direction from a notch line marked on the cell stack.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, fuel cells 1000A and 1000B according to embodiments will be described with reference to the accompanying drawings. The fuel cells 1000A and 1000B will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. In the following description, the +x-axis and the −x-axis will be referred to as a "first direction", the +y-axis and the −y-axis will be referred to as a "second direction", and the +z-axis and the −z-axis will be referred to as a "third direction".

Figure 1A:
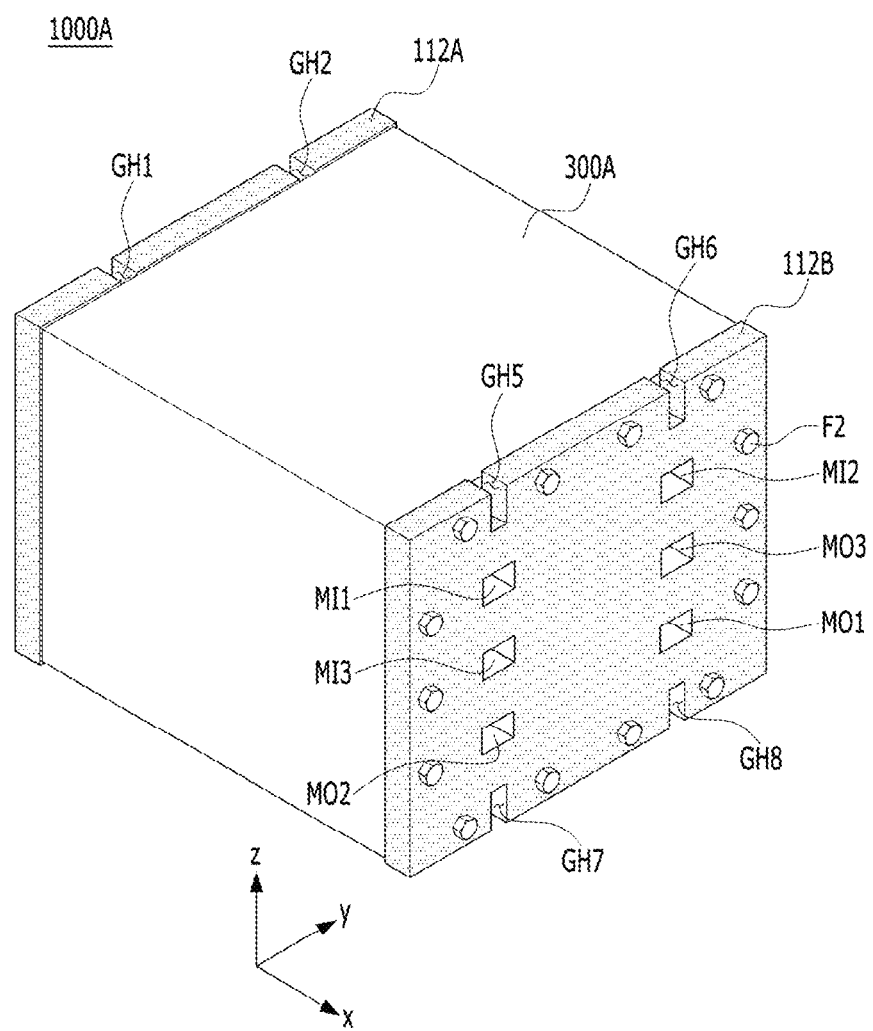
FIG. 1A is a coupled perspective view of a fuel cell according to an embodiment.
Figure 1B:
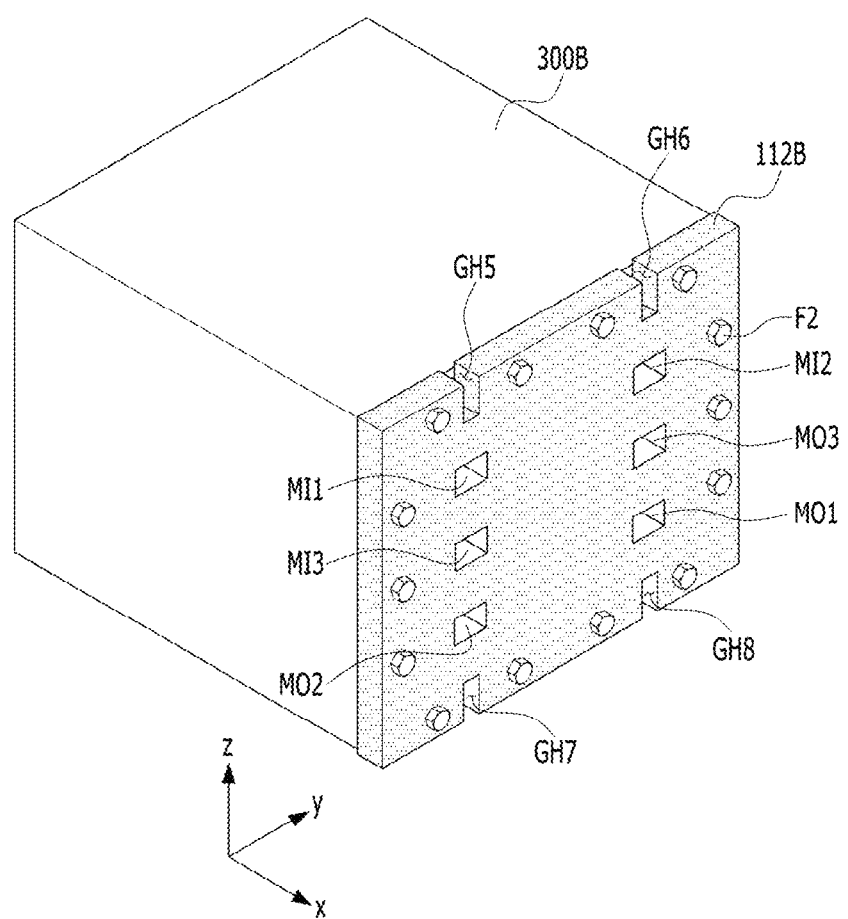
FIG. 1B is a coupled perspective view of a fuel cell according to another embodiment.
Figure 2:
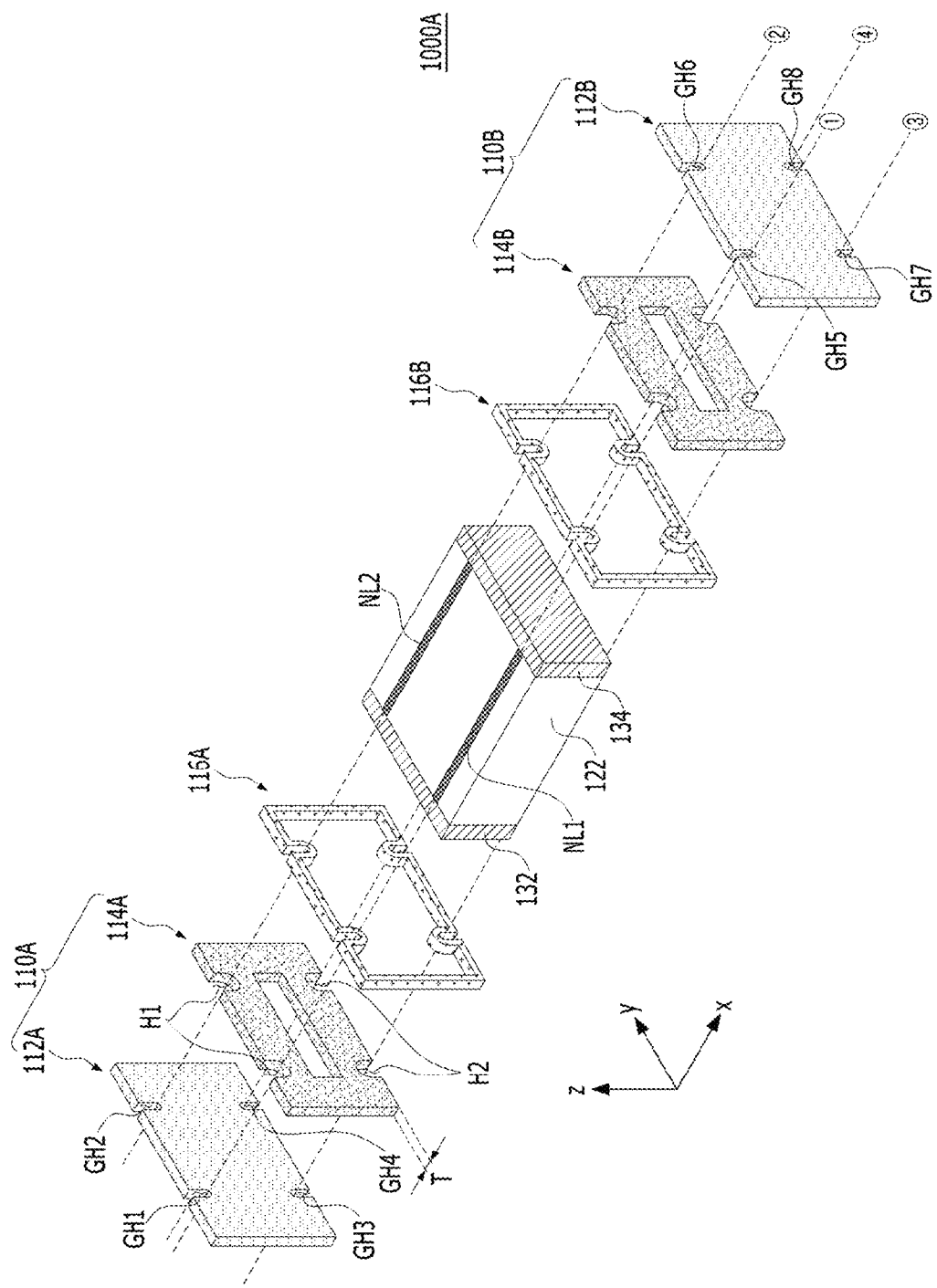
FIG. 2 is an exploded perspective view of the fuel cell shown in FIG. 1A.
Figure 3:
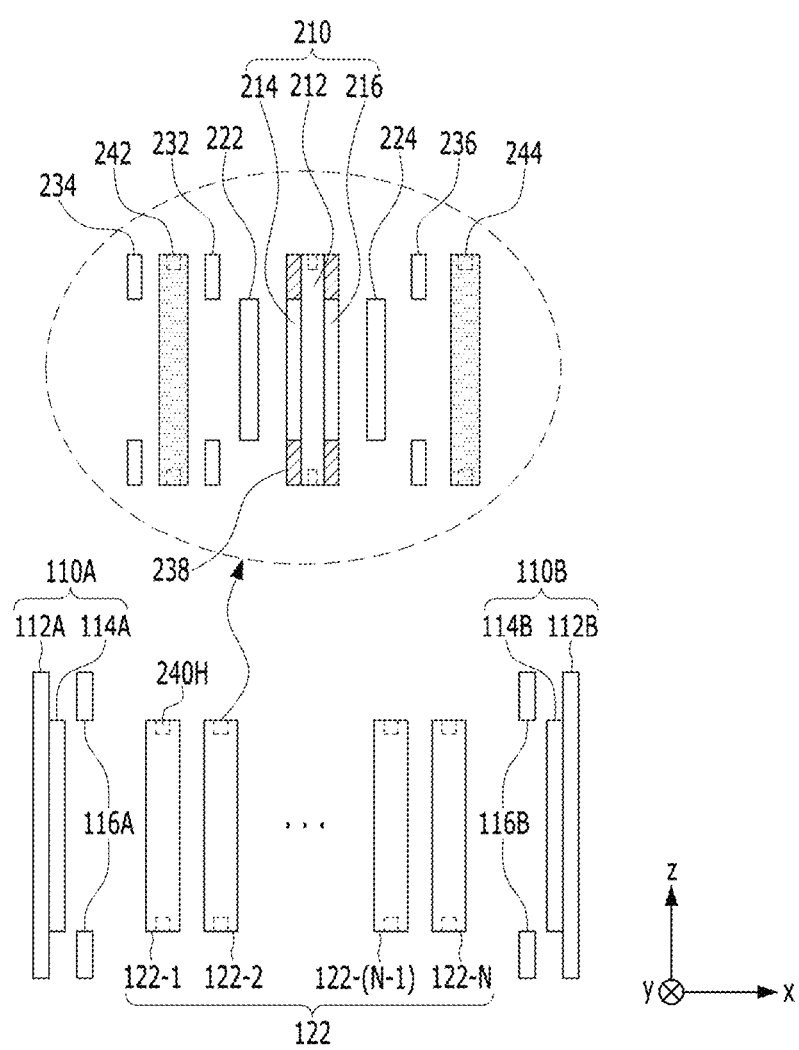
FIG. 3 is a cross-sectional view of the fuel cell shown in FIG. 2.

FIG. 1A is a coupled perspective view of a fuel cell 1000A according to an embodiment, and FIG. 1B is a coupled perspective view of a fuel cell 1000B according to another embodiment. FIG. 2 is an exploded perspective view of the fuel cell 1000A shown in FIG. 1A. FIG. 3 is a cross-sectional view of the fuel cell 1000A shown in FIG. 2.

Figure 5:
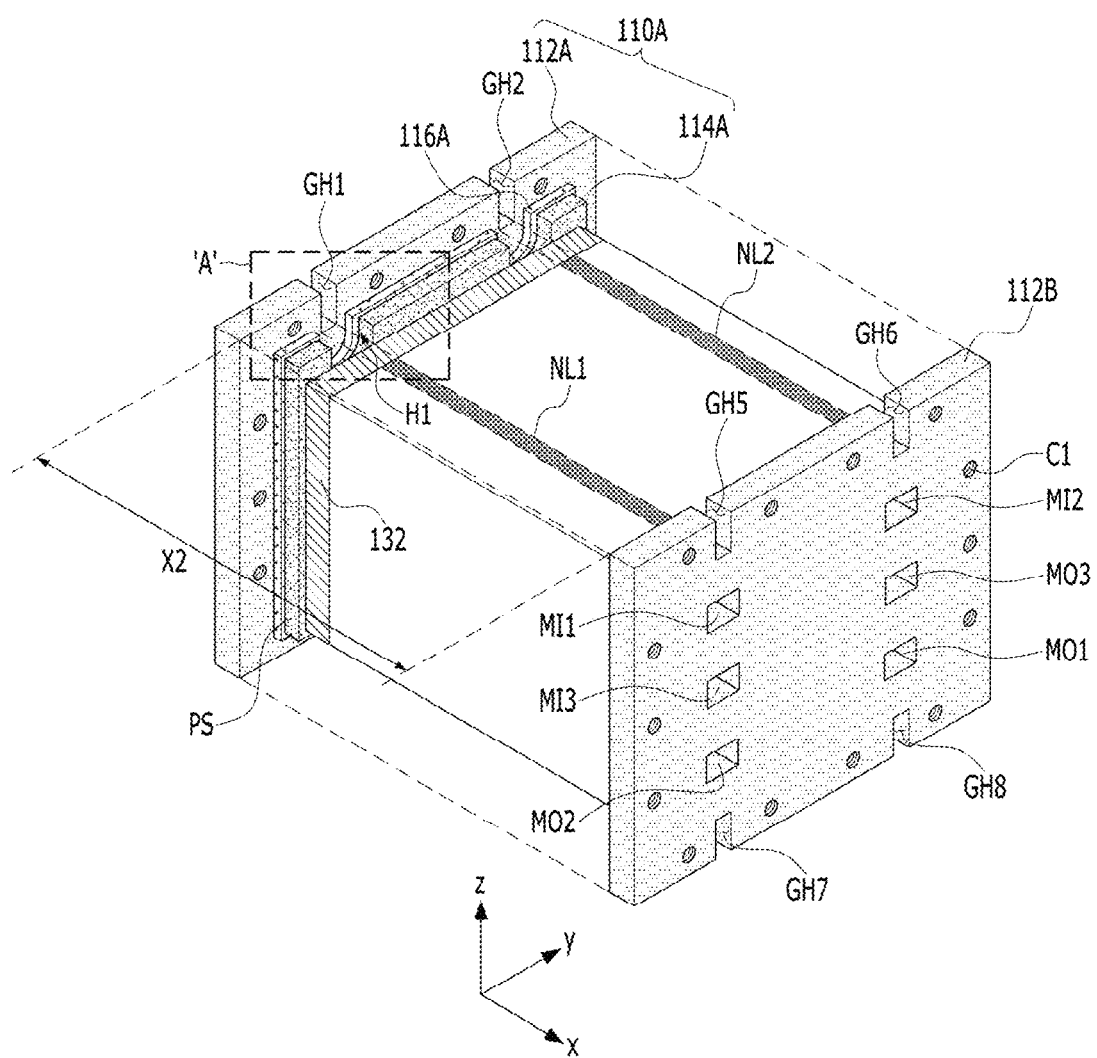
FIG. 5 is a perspective view of an embodiment of a portion of the fuel cell shown in FIG. 1A, from which the enclosure is removed.

For convenience of description, an enclosure 300A and a plurality of manifolds (or communication portions) M, which are shown in FIG. 1A, and a first coupling portion C1, which is shown in FIG. 5 to be described later, are not illustrated in FIG. 2.

In addition, the following description will focus on the fuel cell 1000A shown in FIG. 1A for convenience of description. However, the following description of the fuel cell 1000A may also apply to the fuel cell 1000B shown in FIG. 1B. The reason for this is that the fuel cell 1000B shown in FIG. 1B is the same as the fuel cell 1000A shown in FIG. 1A, except that the enclosure 300B of the fuel cell 1000B differs from the enclosure 300A of the fuel cell 1000A.

The fuel cell 1000A or 1000B may be, for example, a polymer electrolyte membrane fuel cell (or a proton exchange membrane fuel cell) (PEMFC), which has been studied most extensively as a power source for driving vehicles. However, the embodiment is not limited to any specific form of fuel cell.

The fuel cell 1000A may include first and second end plates (or pressing plates or compression plates) 110A and 110B, first and second outer gaskets 116A and 116B, a cell stack 122, and an enclosure 300A. In addition, the fuel cell 1000A, as shown in FIG. 2, may further include first and second end cell heaters 132 and 134. In addition, the fuel cell 1000A may further include current-collecting plates (not shown).

Referring to FIG. 3, the cell stack 122 may include a plurality of unit cells 122-1 to 122-N, which are stacked in the first direction. Here, "N" is a positive integer of 1 or greater, and may range from several tens to several hundreds. The embodiment is not limited to any specific value of "N".

Each unit cell 122-$n$ may generate 0.6 volts to 1.0 volt of electricity, on average 0.7 volts of electricity. Here, $1 \leq n \leq N$. Thus, "N" may be determined in accordance with the intensity of the electric power to be supplied from the fuel cell 1000A to a load. Here, "load" may refer to a part of a vehicle that requires electric power when the fuel cell 1000A is used in the vehicle.

Each unit cell 122-$n$ may include a membrane electrode assembly (MEA) 210, gas diffusion layers (GDLs) 222 and 224, first, second and third inner gaskets 232, 234 and 236, and first and second separators (or bipolar plates) 240 (242 and 244).

The membrane electrode assembly 210 has a structure in which catalyst electrode layers, in which an electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (or an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 1000A, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. The hydrogen ions alone may be selectively transferred to the air electrode 216 through the polymer electrolyte membrane 212, and at the same time, the electrons may be transferred to the air electrode 216 through the first and second separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 1000A may generate electric power due to the electrochemical reaction between hydrogen, which is the fuel, and oxygen contained in the air.

In the air electrode 216, the hydrogen ions supplied through the polymer electrolyte membrane 212 and the electrons transferred through the first and second separators 242 and 244 meet the oxygen in the air supplied to the air electrode 216, thus causing a reaction that generates water (or "condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiment is not limited to any specific configuration of the first and second gas diffusion layers 222 and 224.

The first, second and third gaskets 232, 234 and 236 may serve to maintain the airtightness and clamping pressure of the cell stack at an appropriate level with respect to the reactant gases and the coolant, to disperse the stress when the first and second separators 242 and 244 are stacked, and to independently seal the flow paths. As such, since airtightness and watertightness are maintained by the first, second and third inner gaskets 232, 234 and 236, the flatness of the surfaces that are adjacent to the cell stack 122, which generates electric power, may be secured, and thus surface pressure may be uniformly distributed over the reaction surfaces of the cell stack 122.

The first and second separators 242 and 244 may serve to move the reactant gases and the cooling medium and to separate each of the unit cells from the other unit cells. In addition, the first and second separators 242 and 244 may serve to structurally support the membrane electrode assembly 210 and the gas diffusion layers 222 and 224 and to collect the generated current and transfer the collected current to the current-collecting plates.

The first and second separators 242 and 244 may be respectively disposed outside the first and second gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g., coolant) may flow. Further, the separators 242 and 244 may be formed of a graphite-based material, a composite graphite-based material, or a metal-based material. However, the embodiment is not limited to any specific material of the separators 242 and 244.

As shown in FIGS. 1A to 3, the first and second end plates 100A and 110B may be disposed at respective side ends of the cell stack 122, and may support and fix the cell stack 122, in which a plurality of unit cells is stacked. That is, the first end plate 100A may be disposed at one side end of the cell stack 122, and the second end plate 110B may be disposed at the opposite side end of the cell stack 122.

Each of the first and second end plates 100A and 110B may be formed by combining a plurality of plates.

In addition, at least one of the first end plate 100A or the second end plate 110B may include an outer part and an inner part.

For example, as shown in FIG. 1A, each of the first end plate 100A and the second end plate 110B of the fuel cell 1000A may include an outer part and an inner part. Alternatively, only one of the first end plate 100A and the second end plate 110B of the fuel cell may include an outer part and an inner part.

The first end plate 100A may include a first outer part 112A and a first inner part 114A. The first inner part 114A may be disposed between a first side end, among the two side ends of the cell stack 122 (i.e. one 122-1 of the outermost cells 122-1 and 122-N of the cell stack 122), and the first outer part 112A.

The second end plate 110B may include a second outer part 112B and a second inner part 114B. The second inner pall 114B may be disposed between a second side end, among the two side ends of the cell stack 122 (i.e., the other one 122-N of the outermost cells 122-1 and 122-N of the cell stack 122), and the second outer part 112B.

At least one of the first inner part 114A or the second inner part 114B may have a thickness T in the first direction. For example, the first inner part 114A may have a thickness T in the first direction.

In addition, at least one of the first end plate 100A or the second end plate 110B may include a plurality of manifolds M. In addition, each of the first and second separators 242 and 244 may include manifolds, which are formed in the same shape at the same positions as the manifolds M formed in at least one of the first or second end plate 100A or 110B. Here, the manifold M may include inlet manifolds MI1, MI2 and MI3 and outlet manifolds MO1, MO2 and MO3. Hydrogen and oxygen, which are reactant gases required for the membrane electrode assembly 210, may be introduced from the outside into the cell stack 122 through the inlet manifolds MI1 and MI2. A gas or liquid, to which the reactant gas supplied after being humidified and the condensate water generated in the cell are added, may be discharged to the outside of the fuel cell 1000A through the outlet manifolds MO1 and MO2. In addition, the cooling medium may enter the cell stack 122 from the outside through the inlet manifold MI3, and may be discharged to the outside through the outlet manifold MO3. In this way, the plurality of manifolds M (MI1 to MI3 and MO1 to MO3) allows fluid to flow into and out of the membrane electrode assembly 210.

For example, as shown in FIGS. 1A and 1B, the plurality of manifolds M (MI1 to MI3 and MO1 to MO3) may be formed in the second end plate 110B. Unlike the configuration shown in FIGS. 1A and 1B, the plurality of manifolds M (MI1 to MI3 and MO1 to MO3) may be formed in the first end plate 110A. Alternatively, unlike the configuration shown in FIGS. 1A and 1B, some (e.g. MI1, MI2, MO1 and MO2) of the plurality of manifolds M (MI1 to MI3 and MO1 to MO3) may be formed in the second end plate 110B (or the first end plate 100A), and the remaining ones (e.g. MI3 and MO3) of the plurality of manifolds M (MI1 to MI3 and MO1 to MO3) may be formed in the first end plate 100A (or the second end plate 110B).

For convenience of description, illustration of the plurality of manifolds M (MI1 to MI3 and MO1 to MO3) and the gaskets disposed around the manifolds M (MI1 to MI3 and MO1 to MO3) is omitted from FIG. 2.

The enclosure 300A or 300B may be coupled to at least one of the first end plate 110A or the second end plate 110B to envelop the side portion of the cell stack 122.

As shown in FIG. 1A, the enclosure 300A may be disposed between the first and second end plates 110A and 110B, and may be coupled to the first and second end plates 110A and 110B so as to envelop the side portion of the cell stack 122 disposed between the first and second end plates 110A and 110B.

Alternatively, as shown in FIG. 1B, the enclosure 300B may not be coupled to the first end plate 110A and may be coupled to the second end plate 110B so as to envelop the side portion of the cell stack 122. In this case, the enclosure 300B may be disposed so as to envelop the first end plate 110A.

In addition, the enclosure may be coupled to at least one of the first or second end plate 110A or 110B so as to serve as a clamping member for clamping the plurality of unit cells in the first direction. For example, the pressure by which the cell stack 122 is clamped may be maintained by the enclosure 300A and the first and second end plates 110A and 110B, which have a rigid body structure. This will be described in more detail later.

Referring to FIG. 2, the first stack heating part 132 is disposed between the first side end 122-1, among the two side ends of the cell stack 122, and the first inner part 114A, and the second stack heating part 134 is disposed between the second side end 122-N, among the two side ends of the cell stack 122, and the second inner part 114B. The first and second stack heating parts 132 and 134 serve to heat the cell stack 122.

Hereinafter, the fuel cell 1000A shown in FIG. 1A will be described in detail with reference to the accompanying drawings. The following description may also apply to the configuration in which only one of the first and second end plates 110A and 110B is coupled to the enclosure and the other one thereof is enveloped by the enclosure. For example, the following description of engagement between the second end plate 110B and the end portion of the enclosure 300A may apply to the fuel cell 1000B shown in FIG. 1B, in which the enclosure 300B is coupled to the second end plate 110B and envelops the first end plate 110A.

Figure 4:
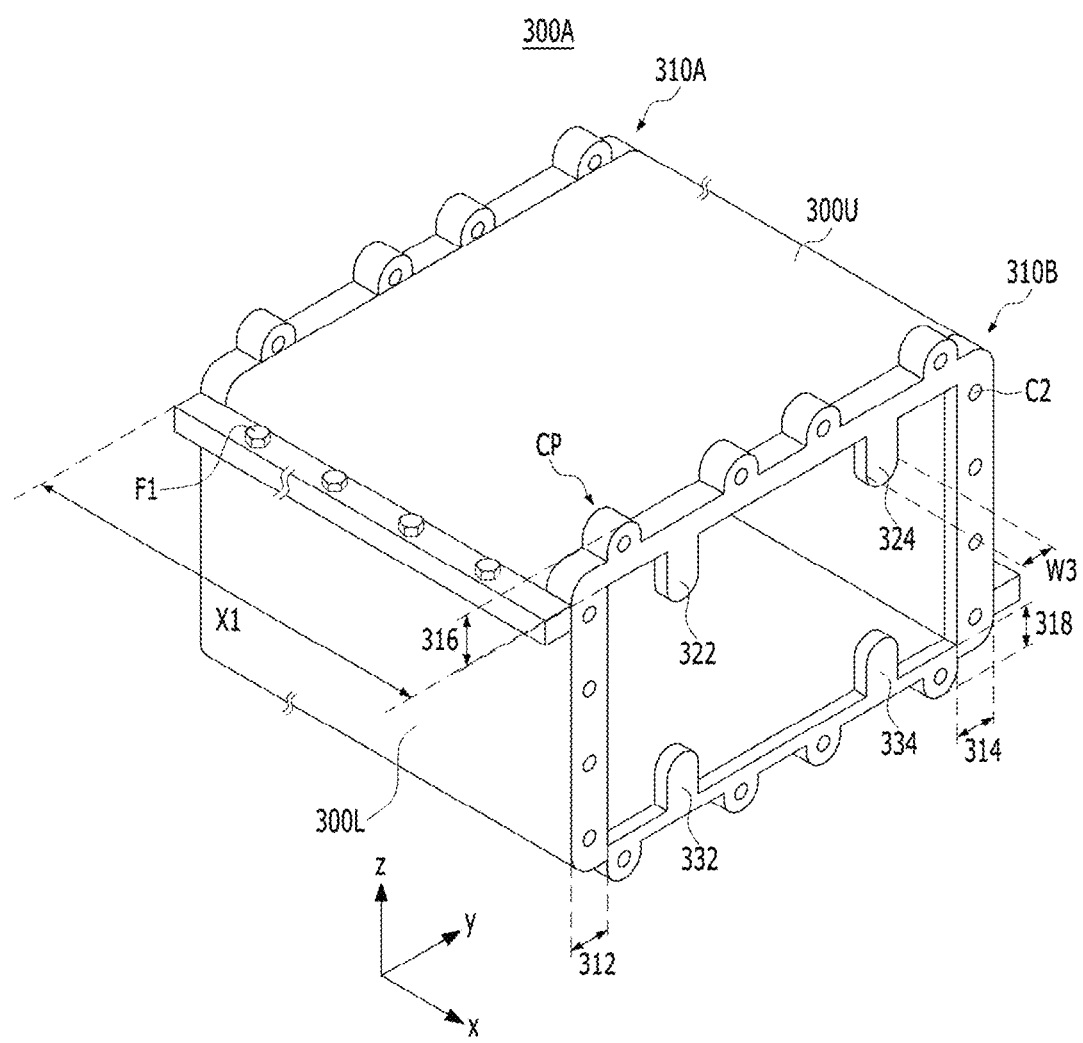
FIG. 4 is a perspective view of the enclosure shown in FIG. 1A.
Figure 6:
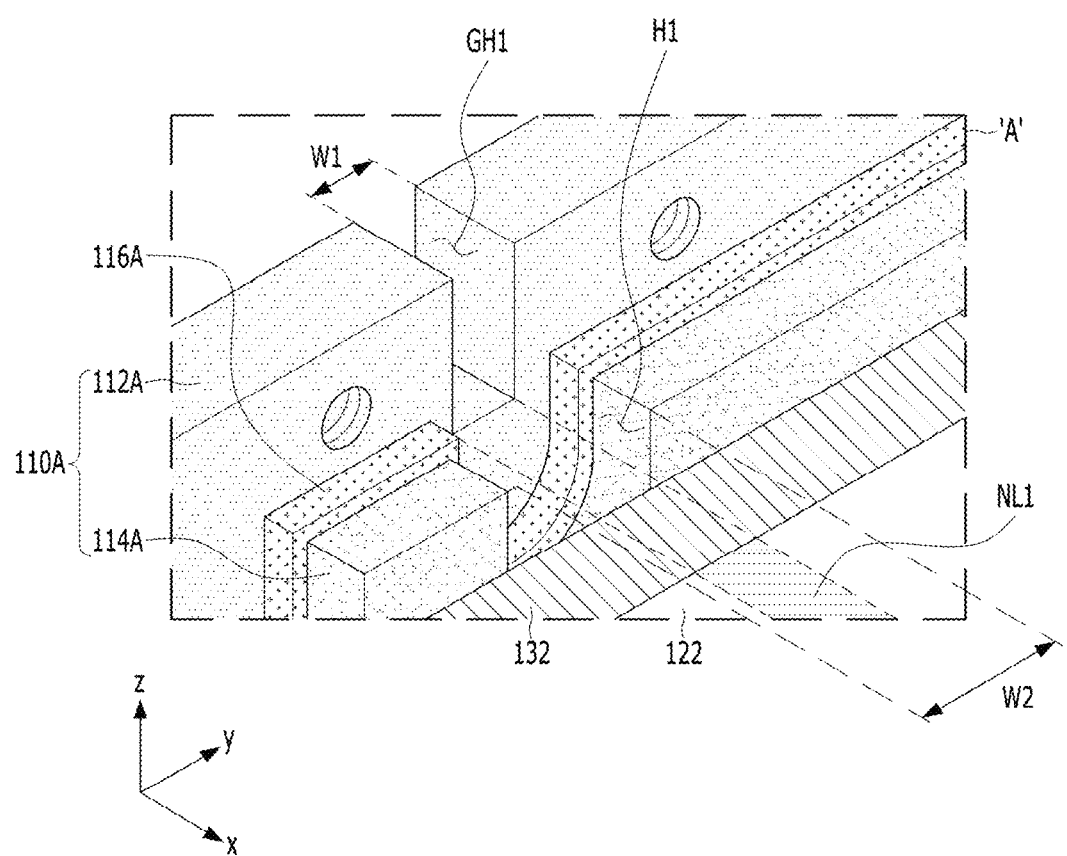
FIG. 6 is an enlarged perspective view of portion 'A' shown in FIG. 5.

FIG. 4 is a perspective view of the enclosure 300A shown in FIG. 1A, FIG. 5 is a perspective view of an embodiment of a portion of the fuel cell 1000A shown in FIG. 1A, from which the enclosure 300A is removed, and FIG. 6 is an enlarged perspective view of portion 'A' shown in FIG. 5.

For example, a first end portion 310A of the enclosure 300A may be coupled to the first end plate 110A, and a second end portion 310B of the enclosure 300A may be coupled to the second end plate 110B. Alternatively, as shown in FIG. 1B, among the first and second end portions 310A and 310B of the enclosure 300B, only the second end portion (e.g. 310B) may be coupled to the second end plate 110B.

Each of the first and second end portions 310A and 310B of the enclosure 300A may include an upper portion, a lower portion, a first side portion, and a second side portion. For example, as shown in FIG. 4, among the first and second end portions 310A and 310B of the enclosure 300A, the second end portion 310B may include first and second side portions 312 and 314, an upper portion 316, and a lower portion 318. In addition, although not shown in FIG. 4, the first end portion 310A of the enclosure 300A may also include first and second side portions, an upper portion, and a lower portion, like the second end portion 310B shown in FIG. 4.

In each of the first and second end portions 310A and 310B of the enclosure 300A, the first side portion and the second side portion may be disposed opposite each other in the second direction, intersecting the first direction. For example, referring to FIG. 4, it can be seen that the first and second side portions 312 and 314 are disposed opposite each other in the second direction in the second end portion 310B of the enclosure 300A. In addition, in each of the first and second end portions 310A and 310B of the enclosure 300A, the upper portion 316 and the lower portion 318 may be disposed opposite each other in the third direction, intersecting the first direction and the second direction. For example, referring to FIG. 4, it can be seen that the upper portion 316 and the lower portion 318 are disposed opposite each other in the third direction in the second end portion 310B of the enclosure 300A.

According to an embodiment, the end portion of the enclosure may include at least one protruding portion, which protrudes toward an end plate, to which the enclosure is coupled, among the first end plate 110A and the second end plate 110B. Here, the at least one protruding portion may include at least one of a first or second protruding portion.

In the case of the configuration shown in FIG. 1A, the first protruding portion may be formed at the first end portion 310A of the enclosure 300A and may protrude toward the first end plate 110A. As illustrated in FIG. 4, the second protruding portion may be formed at the second end portion 310B of the enclosure 300A and may protrude toward the second end plate 110B.

Specifically, the first protruding portion formed at the first end portion 310A of the enclosure 300A may protrude toward the first inner part 114A of the first end plate 110A, and the second protruding portion formed at the second end portion 310B of the enclosure 300A may protrude toward the second inner part 114B of the second end plate 110B.

In the case of the configuration shown in FIG. 1B, only the second end portion 310B, among the first and second end portions 310A and 310B of the enclosure 300B, may include the second protruding portion shown in FIG. 4.

The enclosure may be formed as a unitary body, or may be divided into a plurality of segments. According to an embodiment, as shown in FIG. 4, the enclosure 300A may be divided into two segments, namely first and second segments 300U and 300L. When the enclosure 300A is divided into two segments, as shown in FIG. 4, the first segment 300U may have a '¬'-shaped external external appearance, and the second segment 300L may have an 'L'-shaped external appearance. Alternatively, unlike the configuration shown in FIG. 4, the first segment may have a '-'-shaped (or 'U'-shaped) external appearance, and the second segment may have a 'U'-shaped (or '-'-shaped) external appearance. Alternatively, the first segment may have a '['-shaped (or '|'-shaped) external appearance, and the second segment may have a '|'-shaped (or '['-shaped) external appearance.

Alternatively, as shown in FIG. 1B, the enclosure 300B may have an external appearance that is divided into two segments such that, among the six surfaces of the enclosure 300B, five surfaces thereof correspond to a first segment and the remaining one surface thereof corresponds to a second segment.

Alternatively, the enclosure may be divided into three or four segments. However, the embodiment is not limited as to the specific shape of segments into which the enclosure is divided or the specific number of segments.

In addition, when the enclosure is divided into a plurality of segments, the segments may be coupled to each other in various manners. For example, when the enclosure 300A is divided into two segments, as shown in FIG. 4, at least one first through-hole may be formed in the third direction through a portion of the first segment 300U that is in contact with the second segment 300L, a second through-hole may be formed in the third direction through a portion of the second segment 300L that is in contact with the first segment 300U so as to communicate with the first through-hole, and a first fastener F1 may be fastened into both the first through-hole and the second through-hole to couple the two segments to each other. The first fastener F1 may have a bolt shape or a rivet shape.

Further, when the enclosure is divided into a plurality of segments, at least one protruding portion may protrude from the end portion of at least one of the plurality of segments.

The end plate, which is coupled to the end portion of the enclosure, may include therein at least one receiving recess for receiving the at least one protruding portion. Here, the at least one receiving recess may include at least one of a first or second receiving recess.

In the case of the configuration shown in FIG. 1A, the first receiving recess is formed in the first end plate 110A to receive the first protruding portion, protruding from the first end portion 310A, and the second receiving recess is formed in the second end plate 110B to receive the second protruding portion, protruding from the second end portion 310B. In this way, the first end plate 110A and the second end plate 110B may respectively include therein the first receiving recess and the second receiving recess for receiving the first protruding portion and the second protruding portion, which respectively protrude from the first end portion 310A and the second end portion 310B of the enclosure 300A. These receiving recesses may be formed in the inner parts of the end plates 110A and 110B.

That is, the first inner part 114A of the first end plate 110A may include therein the first receiving recess for receiving the first protruding portion, protruding from the first end portion 310A of the enclosure 300A, and the second inner part 114B of the second end plate 110B may include therein the second receiving recess for receiving the second protruding portion, protruding from the second end portion 310B of the enclosure 300A.

In the case of the configuration shown in FIG. 1B, since only the second end portion 310B of the enclosure 300B includes the second protruding portion shown in FIG. 4, only the second end plate 110B may include the second receiving recess formed therein.

The at least one protruding portion may protrude from at least one of the upper portion, the lower portion, the first side portion, or the second side portion of the enclosure. In this case, according to the embodiment, the at least one protruding portion may protrude in at least one of the first to third directions.

Hereinafter, the fuel cell 1000A shown in FIG. 1A will be described as being configured such that the first protruding portion and the second protruding portion protrude from the upper portion 316 and the lower portion 318 of the enclosure 300A, respectively, in the third direction. However, the embodiment is not limited thereto. Therefore, the following description may also apply to the configuration in which at least one protruding portion protrudes from at least one of the upper portion, the lower portion, the first side portion, or the second side portion of the enclosure toward the end plate in at least one of the second or third direction, unlike the configuration shown in FIG. 1A.

The first protruding portion may protrude from at least one of the upper portion, the lower portion, the first side portion, or the second side portion of the first end portion 310A of the enclosure 300A toward the first end plate 110A. The second protruding portion may protrude from at least one of the upper portion, the lower portion, the first side portion, or the second side portion of the second end portion 310B of the enclosure 300A toward the second end plate 110B.

Hereinafter, the second protruding portion disposed at the second end portion 310B, among the first and second end portions 310A and 310B of the enclosure 300A, will be described with reference to FIG. 4. The following description may also apply to the first protruding portion disposed at the first end portion 310A, among the first and second end portions 310A and 310B of the enclosure 300A.

Each of the first and second protruding portions may be provided in a singular or plural number. The second protruding portion may include $2\text{-}1^{st}$ protruding portions 322 and 324 and $2\text{-}2^{nd}$ protruding portions 332 and 334. The $2\text{-}1^{st}$ protruding portions 322 and 324 may protrude from the upper portion 316 of the second end portion 310B of the enclosure 300A toward the receiving recess formed in the second inner part 114B of the second end plate 110B. The $2\text{-}2^{nd}$ protruding portions 332 and 334 may protrude from the lower portion 318 of the second end portion 310B of the enclosure 300A toward the receiving recess formed in the second inner part 114B of the second end plate 110B.

In the case of the configuration shown in FIG. 4, the number of 2-$1^{st}$ protruding portions 322 and 324 is two, and the number of 2-$2^{nd}$ protruding portions 332 and 334 is also two. However, the embodiment is not limited thereto. The number of each of the 2-$1^{st}$ and 2-$2^{nd}$ protruding portions may be one, or may be three or more. The number of 2-$1^{st}$ protruding portions and the number of 2-$2^{nd}$ protruding portions may be the same, as shown in FIG. 4, or may be different.

In addition, the 2-$1^{st}$ protruding portions and the 2-$2^{nd}$ protruding portions may protrude so as to be symmetrical in the second direction and the third direction. However, the embodiment is not limited thereto. Unlike the configuration shown in FIG. 4, the 2-$1^{st}$ protruding portions and the 2-$2^{nd}$ protruding portions may protrude asymmetrically.

Similar to the second protruding portion, the first protruding portion may include 1-$1^{st}$ and 1-$2^{nd}$ protruding portions. The 1-$1^{st}$ and 1-$2^{nd}$ protruding portions may have the same shape as or different shapes from the 2-$1^{st}$ and 2-$2^{nd}$ protruding portions, respectively.

At least one receiving recess may be formed in the end plate, which is coupled to the enclosure, so as to receive the protruding portion.

In the case of the fuel cell 1000A shown in FIG. 1A, the first receiving recess may be formed in the first inner part 114A of the first end plate 110A, and may include 1-$1^{st}$ and 1-$2^{nd}$ receiving recesses H1 and H2. In addition, the second receiving recess may be formed in the second inner part 114B of the second end plate 110B, and may include 2-$1^{st}$ and 2-$2^{nd}$ receiving recesses.

For example, the 1-$1^{st}$ receiving recess H1 may be formed in the first inner part 114A of the first end plate 110A to receive the 1-$1^{st}$ protruding portion protruding from the first end portion 310A of the enclosure 300A. The 1-$2^{nd}$ receiving recess H2 may be formed in the first inner part 114A to receive the 1-$2^{nd}$ protruding portion protruding from the first end portion 310A of the enclosure 300A. The 2-$1^{st}$ receiving recess may be formed in the second inner part 114B of the second end plate 110B to receive the 2-$1^{st}$ protruding portion protruding from the second end portion 310B of the enclosure 300A. The 2-$2^{nd}$ receiving recess may be formed in the second inner part 114B to receive the 2-$2^{nd}$ protruding portion protruding from the second end portion 310B of the enclosure 300A.

For example, when each of the 1-$1^{st}$ protruding portion and the 1-$2^{nd}$ protruding portion includes two protruding portions, as shown in FIG. 2, the number of each of the 1-$1^{st}$ receiving recess H1 and the 1-$2^{nd}$ receiving recess H2, which are formed in the first inner part 114A of the first end plate 110A, may be two. In addition, when each of the 2-$1^{st}$ protruding portion and the 2-$2^{nd}$ protruding portion includes two protruding portions, the number of each of the 2-$1^{st}$ receiving recess and the 2-$2^{nd}$ receiving recess, which are formed in the second inner part 114B of the second end plate 110B, may be two.

At least one receiving recess may be formed in the edge of the inner part. For example, the 1-$1^{st}$ and 1-$2^{nd}$ receiving recesses H1 and H2 may be formed in the edge of the first inner part 114A, and the 2-$1^{st}$ and 2-$2^{nd}$ receiving recesses may be formed in the edge of the second inner part 114B. Referring to FIG. 2, the 1-$1^{st}$ receiving recess H1 may be formed in the upper edge of the first inner part 114A, and the 1-$2^{nd}$ receiving recess H2 may be formed in the lower edge of the first inner part 114A. As described above, one protruding portion may be seated and fixed in one receiving recess.

The fuel cell 1000A or 1000B according to the embodiment may further include an outer gasket disposed between the outer part and the enclosure. The fuel cell 1000A shown in FIG. 1A may include a first outer gasket 116A and a second outer gasket 116B. The fuel cell 1000B shown in FIG. 1B may include only a second outer gasket 116B.

Hereinafter, the first outer gasket 116A and the second outer gasket 116B included in the fuel cell 1000A shown in FIG. 1A will be described. The following description of the second outer gasket 116B may also apply to the second outer gasket included in the fuel cell 1000B shown in FIG. 1B.

FIGS. 7A to 7F are partial cross-sectional views for explaining the engagement of the first outer part 112A, the first inner part 114A, the first outer gasket 116A, and the enclosure 300A according to an embodiment.

Although not shown, the second outer part 112B, the second inner part 114B, the second outer gasket 116B, and the enclosure 300A may also be coupled to each other in the manner shown in FIGS. 7A to 7F.

The first outer gasket 116A may be disposed between a first inner surface IS1 of the first outer part 112A and an outer surface OS of the first end portion 310A of the enclosure 300A in the first direction.

Figure 7A:
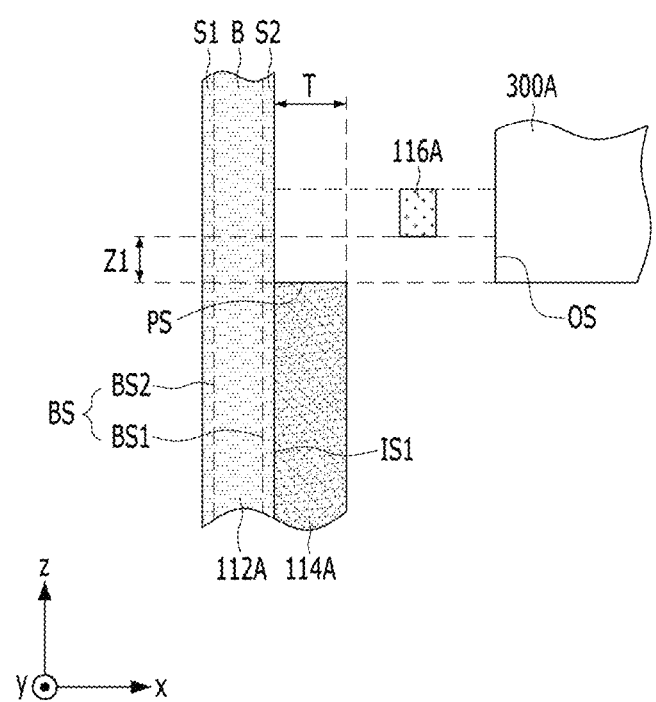
FIGS. 7A to 7F are partial cross-sectional views for explaining the engagement of a first outer part, a first inner part, a first outer gasket, and an enclosure according to an embodiment.
Figure 7B:
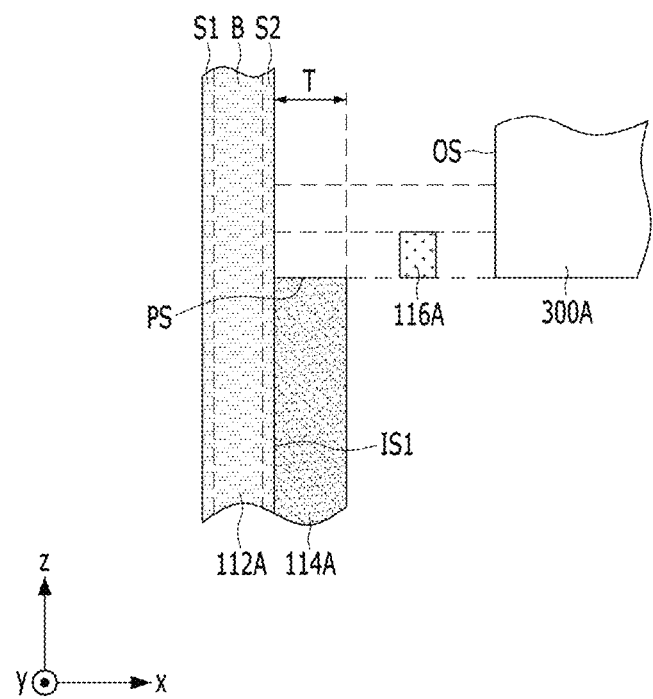
Figure 7C:
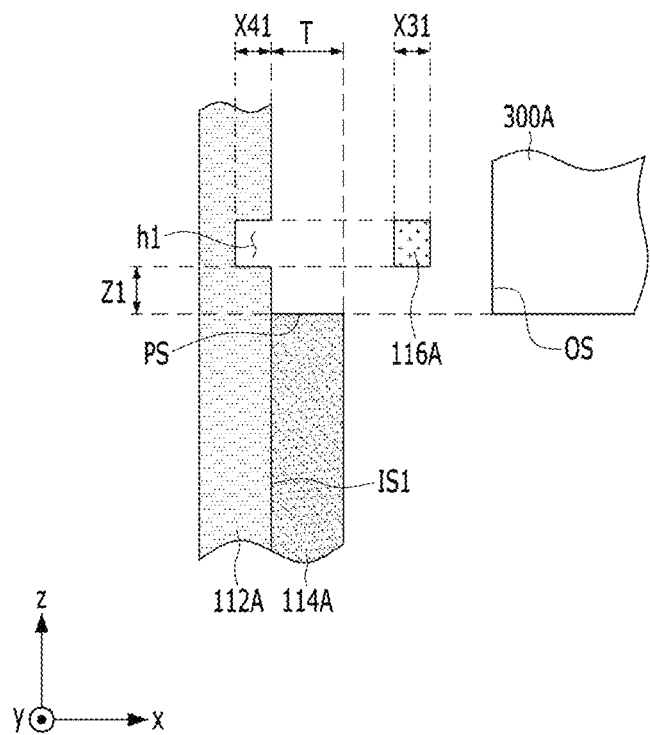
Figure 7D:
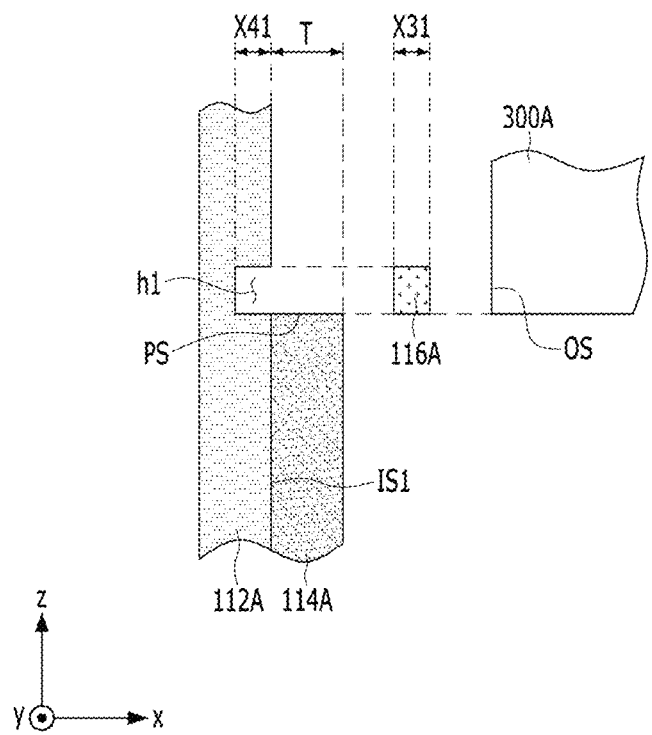
Figure 7E:
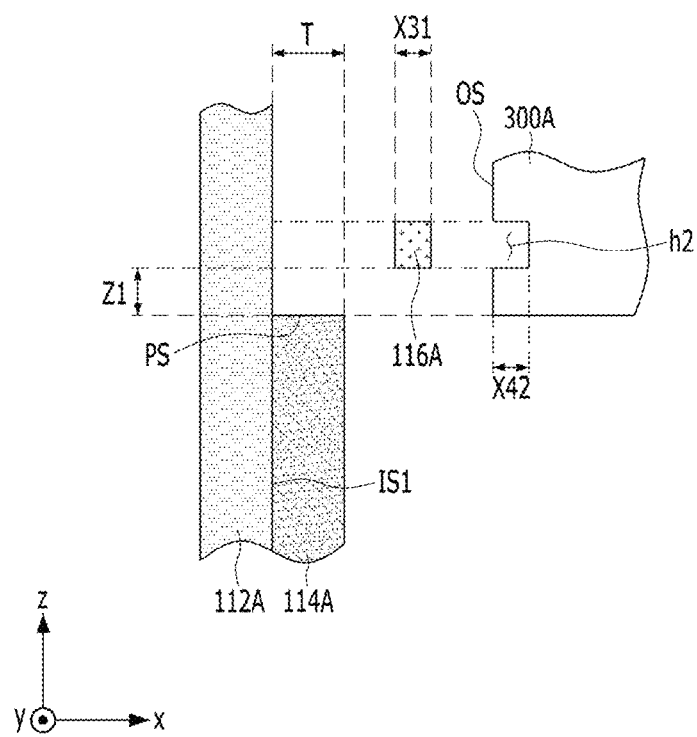
Figure 7F:
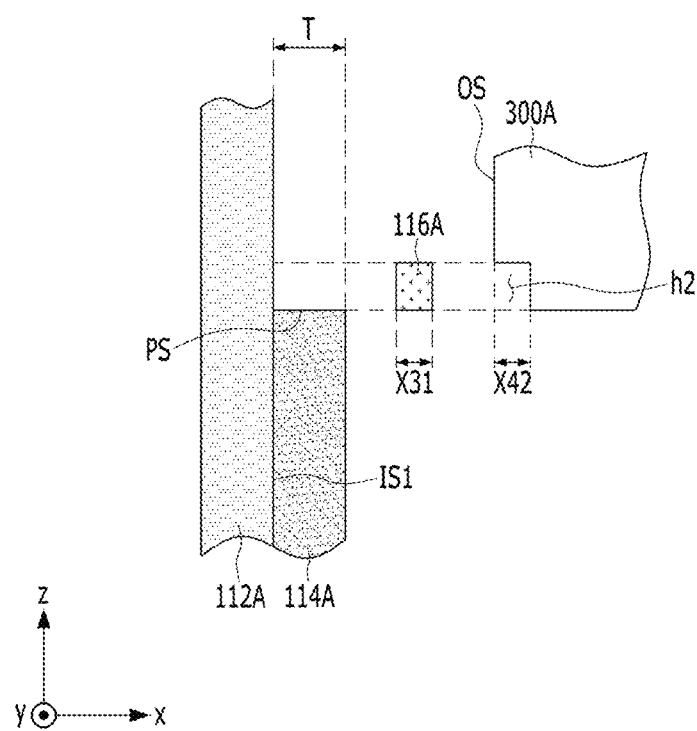

According to an embodiment, as shown in FIGS. 7B, 7D and 7F, the first outer gasket 116A may be disposed in contact with the edge PS of the first inner part 114A. For example, referring to FIG. 5, it can be seen that the first outer gasket 116A is disposed in contact with the entirety of the edge PS of the first inner part 114A. Although not shown, similar to the first outer gasket 116A disposed in contact with the first inner part 114A, the second outer gasket 116B may be disposed in contact with the entirety of the edge of the second inner part 114B.

Figure 10:
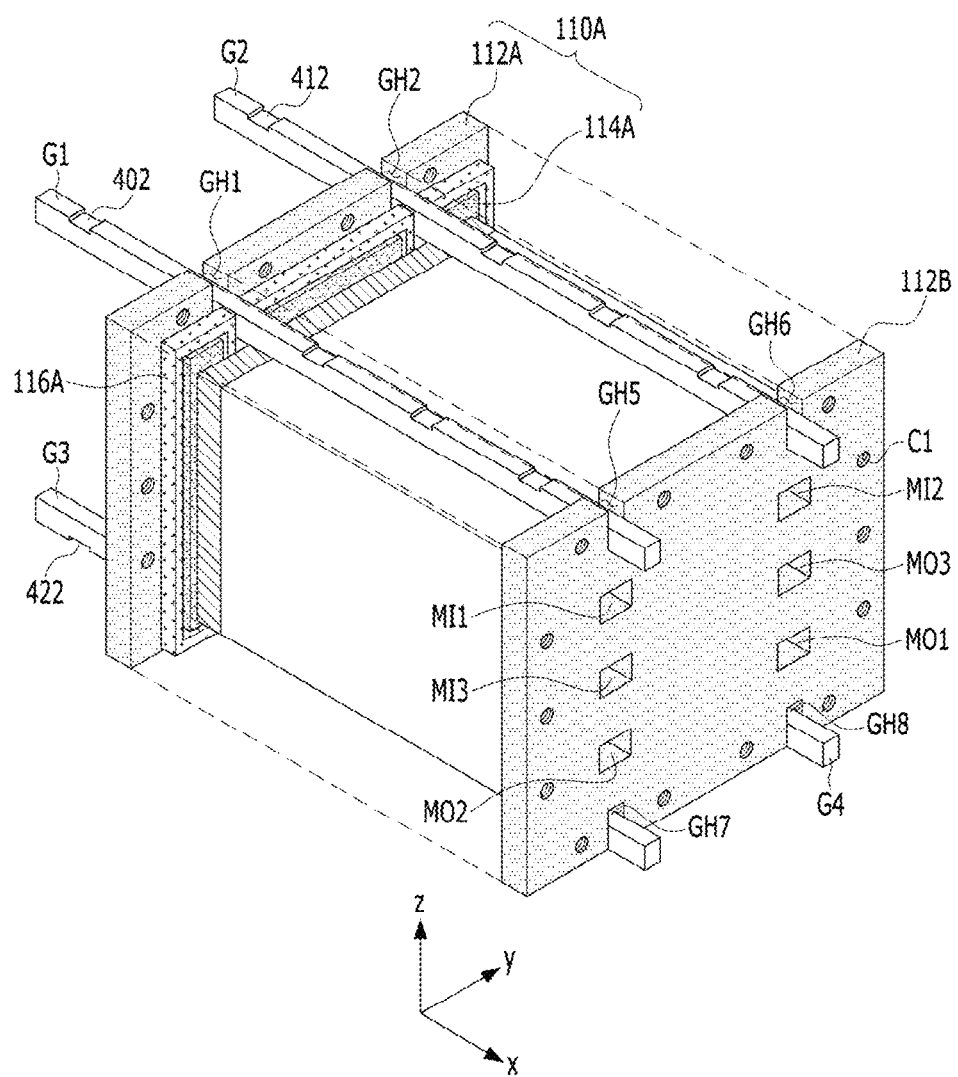
FIG. 10 is a perspective view of the fuel cell for explaining guide members and guide support holes used to manufacture the fuel cell.

According to another embodiment, as shown in FIGS. 7A, 7C and 7E, the first outer gasket 116A may be disposed so as to be spaced apart from the edge PS of the first inner part 114A by a predetermined distance in the second and third directions (e.g. by Z1 in the third direction). For example, as shown in FIG. 10 to be described later, it can be seen that the first outer gasket 116A is disposed so as to be spaced apart from the entirety of the edge PS of the first inner part 114A. Although not shown, similar to the first outer gasket 116A disposed so as to be spaced apart from the first inner part 114A, the second outer gasket 116B may be disposed so as to be spaced apart from the edge of the second inner part 114B by a predetermined distance in the second and third directions. Unlike the configuration shown in FIG. 5, the first outer gasket 116A may be disposed so as to be spaced apart from the entirety of the edge PS of the first inner part 114A in the second and third directions.

In addition, the first outer gasket 116A shown in FIGS. 7A and 7B may be disposed on the first inner surface IS1 of the first outer part 112A or the outer surface OS of the enclosure 300A. Specifically, the first outer gasket 116A may be disposed on the first inner surface IS1 of the first outer part 112A, which faces the outer surface OS of the enclosure 300A in the first direction, or may be disposed on the outer surface OS of the enclosure 300A, which faces the first inner surface IS1 of the first outer part 112A in the first direction. For example, the first outer gasket 116A may be attached to the first inner surface IS1 or the outer surface OS using an adhesive (not shown).

In addition, the outer part may include a first recess h1 formed in the inner surface thereof, and at least a portion of the outer gasket may be inserted into and fixed in the first recess h1. The thickness of the outer gasket in the first direction may be greater than the depth of the first recess h1 in the first direction. This means that the outer gasket is partially inserted into the first recess h1. The first recess h1 may be formed in a portion of the inner surface of the outer part that faces the outer surface of the enclosure 300A.

For example, referring to FIGS. 7C and 7D, a portion of the first outer gasket 116A may be inserted into the first recess h1. The thickness X31 of the first outer gasket 116A in the first direction may be greater than the depth X41 of the first recess h1 in the first direction.

As another example, the enclosure may include a second recess h2 formed in the outer surface thereof, and at least a portion of the outer gasket may be inserted into and fixed in the second recess h2. The thickness of the outer gasket in the first direction may be greater than the depth of the second recess h2 in the first direction. This means that the outer gasket is partially inserted into the second recess h2. The second recess h2 may be formed in the portion of the outer surface of the enclosure 300A that faces the inner surface of the outer part.

For example, referring to FIGS. 7E and 7F, a portion of the first outer gasket 116A may be inserted into the second recess h2. The thickness X31 of the first outer gasket 116A in the first direction may be greater than the depth X42 of the second recess h2 in the first direction.

Each of the first and second outer gaskets 116A and 116B may be made of an insulating material such as resin. For example, each of the first and second outer gaskets 116A and 116B may be made of rubber or plastic. However, the embodiment is not limited to any specific material of each of the first and second outer gaskets 116A and 116B.

Figure 8:
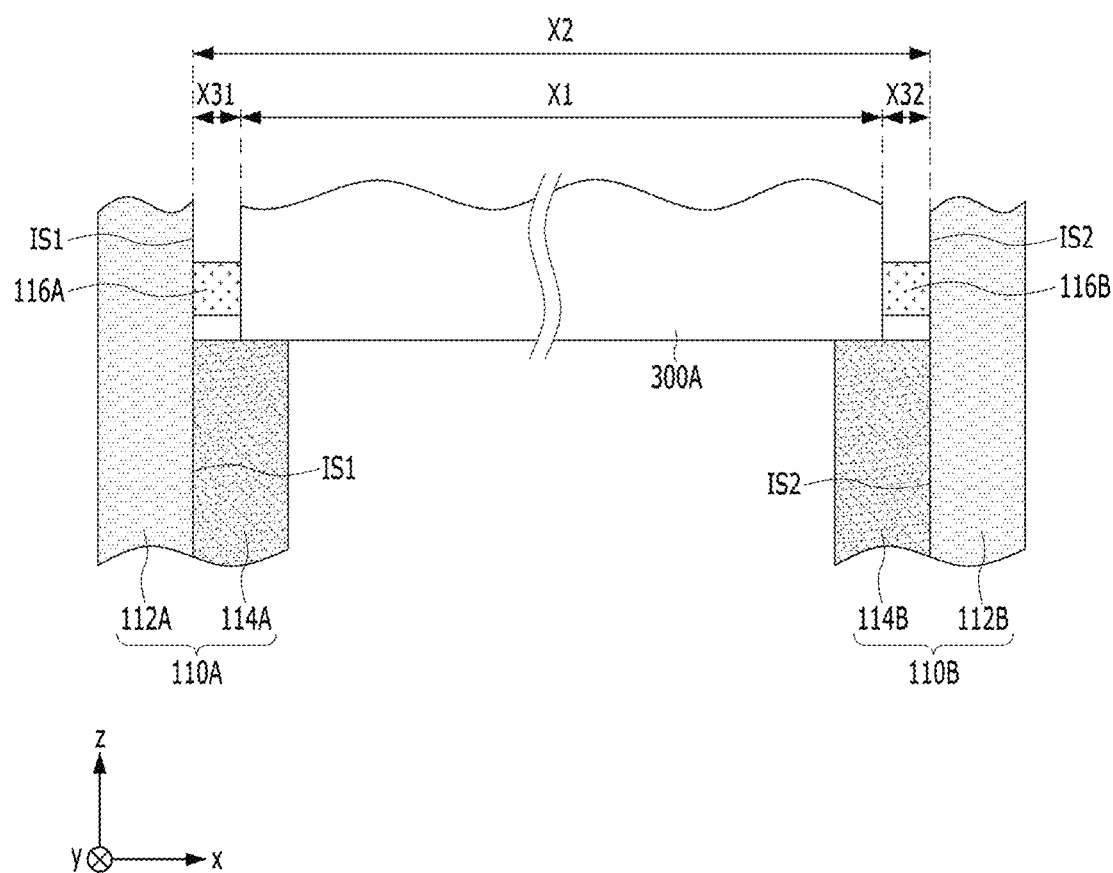
FIG. 8 is a partial cross-sectional view of first and second end plates, a first outer gasket, a second outer gasket, and an enclosure in the fuel cell shown in FIG. 1A.

FIG. 8 is a partial cross-sectional view of the first and second end plates 110A and 110B, the first outer gasket 116A, the second outer gasket 116B, and the enclosure 300A in the fuel cell 1000A shown in FIG. 1A.

According to the embodiment, as shown in FIGS. 4 and 8, the enclosure 300A has a length X1 in the first direction. In this case, the first inner surface IS1 of the first outer part 112A of the first end plate 110A and the second inner surface IS2 of the second outer part 112B of the second end plate 110B are spaced apart from each other by an interval X2 in the first direction. According to the embodiment, the length X1 may be less than the interval X2. The reason for this is that not only the enclosure 300A but also the first and second outer gaskets 116A and 116B are disposed in the space formed by the interval X2. Referring to FIG. 8, the interval X2 and the length X1 may have the relationship therebetween expressed using Equation 1 below.

$$X2=X1+X31+X32 \qquad \text{[Equation 1]}$$

Here, X31 represents the thickness of the first outer gasket 116A in the first direction, and X32 represents the thickness of the second outer gasket 116B in the first direction.

Figure 9A:
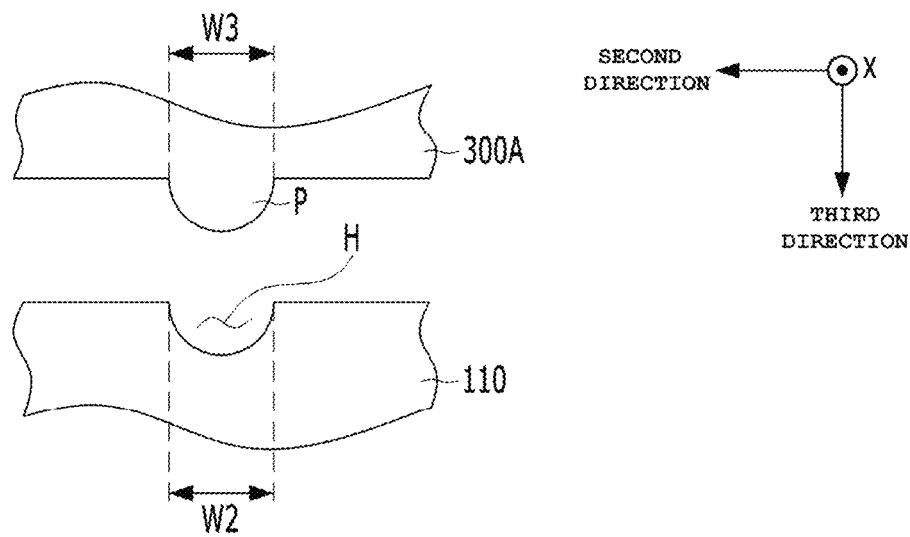
FIGS. 9A and 9B are exploded cross-sectional views of a protruding portion and a receiving recess according to an embodiment.
Figure 9B:
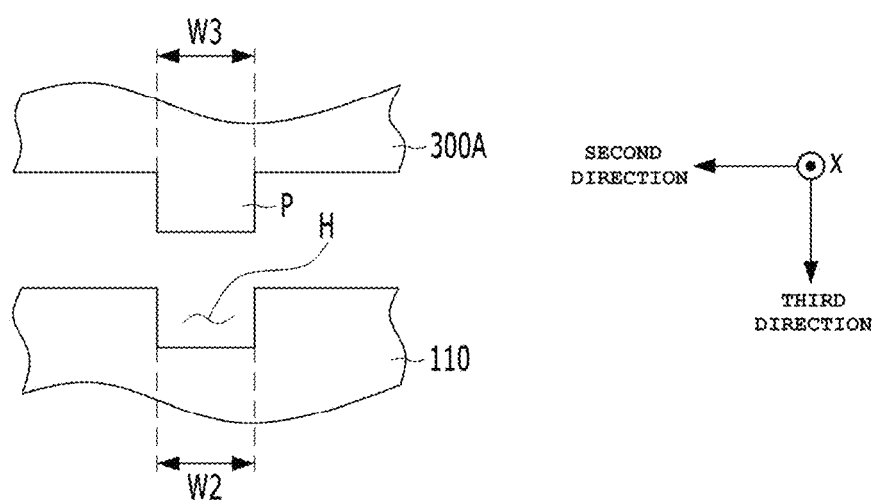

FIGS. 9A and 9B are exploded cross-sectional views of the protruding portion and the receiving recess according to an embodiment. In FIGS. 9A and 9B, P denotes the protruding portion of the enclosure described above, and H denotes the receiving recess in the inner part described above.

The protruding portion P may have any of various cross-sectional shapes, and the receiving recess H may have a cross-sectional shape corresponding to that of the protruding portion P.

For example, as shown in FIG. 9A, the protruding portion P may protrude in a 'U' shape, and the receiving recess H may be concavely formed in a 'U' shape.

Alternatively, as shown in FIG. 9B, the protruding portion P may protrude in a rectangular shape, and the receiving recess H may be concavely formed in a rectangular shape.

However, the shapes of the protruding portion and the receiving recess may be different from those shown in FIGS. 9A and 9B. The embodiment is not limited to any specific shape of each of the protruding portion and the receiving recess.

Each of the outer part and the inner part included in each of the first and second end plates 110A and 110B may be made of any of various materials.

The materials of the first and second end plates 110A and 110B may be determined so as to increase the engagement force between the receiving recess and the protruding portion or to achieve electrical insulation therebetween.

When the protruding portion of the enclosure 300A includes a conductive material, the portion of the inner part in which the receiving recess is formed to receive the protruding portion may include an insulating material. For example, when the 2-$1^{st}$ protruding portions 322 and 324 include a conductive material, the portion of the second inner part 114B in which the 2-$1^{st}$ receiving recesses H1 are formed to receive the 2-$1^{st}$ protruding portions 322 and 324 may include an insulating material. Similarly, when the 2-$2^{nd}$ protruding portions 332 and 334 include a conductive material, the portion of the second inner part 114B in which the 2-$2^{nd}$ receiving recesses H2 are formed to receive the 2-$2^{nd}$ protruding portions 332 and 334 may include an insulating material.

In general, the enclosures 300A and 300B may be made of metal, for example, aluminum. Therefore, when the portions of the first and second inner parts 114A and 114B in which the receiving recesses for receiving the conductive protruding portions of the enclosure 300A are formed are made of an insulating material, for example, resin, the engagement force between the protruding portions (e.g. 322, 324, 332 and 334) and the receiving recesses (e.g. H1 and H2) may be increased.

In addition, the first and second end plates 100A and 110B may be made of a highly rigid material in order to withstand the internal surface pressure of the cell stack 122. For example, at least a portion of each of the first and second end plates 110A and 110B may be formed by machining a metal material.

According to an embodiment, the first and second outer parts 112A and 112B and the first and second inner parts 114A and 114B may include metal. That is, the material of each of the first and second outer parts 112A and 112B and the first and second inner parts 114A and 114B may be metal. In this case, the first outer part 112A and the first inner part 114A may be integrally made of metal through injection molding, and the second outer part 112B and the second inner part 114B may be integrally made of metal through injection molding. The first outer gasket 116A may be provided separately from the first outer part 112A and the first inner part 114A, and the second outer gasket 116B may be provided separately from the second outer part 112B and the second inner part 114B.

According to another embodiment, each of the first outer part 112A and the second outer part 112B may include metal, and the first inner part 114A may include an insulating material. That is, the material of each of the first outer part 112A and the second outer part 112B may be metal, and the material of the first inner part 114A may be an insulating material. When the first inner part 114A and the first outer gasket 116A are made of the same material, for example, resin, the first outer gasket 116A may be integrated with the first inner part 114A. In addition, when the second inner part 114B and the second outer gasket 116B are made of the same material, for example, resin, the second outer gasket 116B may be integrated with the second inner part 114B.

According to still another embodiment, the outer part may include a body and a shell. The body B may include metal. In addition, the at least one shell may be disposed on at least one of an outer surface or an inner surface of the body, and may be insulative.

For better understanding, referring to FIGS. 7A and 7B, the body B of the first outer part 112A may include metal, and may include an inner surface BS1, which faces the first inner part 114A. At least one shell of the first outer part 112A may be disposed on at least one of the outer surface BS2 or the inner surface BS1 of the body B, among the two surfaces BS (BS1 and BS2) of the body B. Although the at least one shell is illustrated in FIGS. 7A and 7B as including a first shell S1 and a second shell S2, the embodiment is not limited thereto. According to another embodiment, the at least one shell may include only the second shell S2, and the first shell S1 may be omitted. When the second shell S2 and the first outer gasket 116A are made of the same material, for example, resin, the first outer gasket 116A may be integrated with the second shell S2.

As described above, the outer gasket may be integrated with at least one of the shell or the inner part.

The material of the first outer part 112A and the material of the second outer part 112B may be different from each other, or may be the same as each other. In addition, the material of the first inner part 114A and the material of the second inner part 114B may be different from each other, or may be the same as each other.

As described above, the material of the first outer part 112A and the material of the first inner part 114A may be the same as each other, or may be different from each other. The material of the second outer part 112B and the material of the second inner part 114B may be the same as each other, or may be different from each other.

The first to third inner gaskets 232, 234 and 236 described above serve to maintain airtightness and watertightness with respect to the reactant gas and the coolant, which are fluids in the cell stack 122, and to maintain resistance to dust. For example, the first and second separators 242 and 244 need to be airtight and watertight so that the reducing gas, the oxidizing gas, and the coolant are prevented from mixing with each other. The first to third inner gaskets 232, 234 and 236 are applied to the surfaces of the first and second separators 242 and 244 in order to secure airtightness with respect to the fluids and to maintain the surface pressure.

The first and second outer gaskets 116A and 116B serve to maintain airtightness, watertightness, and resistance to entry of dust from the outside of the inside of the fuel cell 1000A.

As shown in FIG. 5, each of the first and second outer parts 112A and 112B may include a first coupling portion C1. As shown in FIG. 4, the enclosure 300A may include a second coupling portion C2. The first coupling portion C1 may be disposed at the peripheral portion of each of the first and second outer parts 112A and 112B, and the second coupling portion C2 may be formed at the peripheral portion of the enclosure 300A so as to communicate with the first coupling portion C1.

For example, at least one of the first or second coupling portions C1 or C2 may have the form of a through-hole or a blind hole that extends in the first direction. In this case, the fuel cell 1000A may further include a second fastener F2, which is fastened into both the first coupling portion C1 and the second coupling portion C2, as shown in FIG. 1A.

As shown in FIGS. 1A, 4 and 5, the number of each of the first coupling portions C1, the second coupling portions C2, and the second fasteners F2 may be 28. However, the embodiment is not limited thereto.

In addition, a coupling protruding portion CP, at which the second coupling portion C2 is disposed, may be located on at least one of the first side portion 312, the second side portion 314, the upper portion 316, or the lower portion 318 of the enclosure 300A.

For example, as shown in FIG. 4, some of the second coupling portions C2 may be disposed at the first and second side portions 312 and 314, and the remaining ones of the second coupling portions C2 may be disposed at the coupling protruding portions CP, which are formed on the upper portion 316 and the lower portion 318 of the enclosure 300A. Some of the coupling protruding portions CP may protrude upwards from the upper portion 316 of the enclosure 300A, and the remaining ones of the coupling protruding portions CP may protrude downwards from the lower portion 318 of the enclosure 300A, thereby forming a region in which the remaining ones of the second coupling portions C2 are disposed.

The force that clamps the cell stack 122 in the first direction may be supplemented by the engagement force of the first coupling portion C1 and the second coupling portion C2, whereby the clamping pressure of the cell stack 122 may be maintained.

Hereinafter, a method of manufacturing the fuel cell 1000A will be described briefly with reference to the accompanying drawings. Although only a method of manufacturing the fuel cell 1000A shown in FIG. 1A will be described, the method may be modified and applied to a method of manufacturing the fuel cell 1000B shown in FIG. 1B.

FIG. 10 is a perspective view of the fuel cell 1000A for explaining guide members G1, G2, G3 and G4 and guide support holes GH1 to GH8 used to manufacture the fuel cell 1000A. In order to describe the guide members G1, G2, G3 and G4, illustration of the enclosure 300A is omitted from FIG. 10.

Each of the first outer part 112A of the first end plate 110A and the second outer part 112B of the second end plate 110B may include therein a plurality of guide support holes. For example, the first outer part 112A may include first to fourth guide support holes GH1 to GH4 formed in the edge thereof, and the second outer part 112B may include fifth to eighth guide support holes GH5 to GH8 formed in the edge thereof. Although each of the first and second outer parts 112A and 112B is illustrated as having four guide support holes, the embodiment is not limited as to the specific number of guide support holes formed in each of the first and second outer parts 112A and 112B. Further, the number of guide support holes may be the same as the number of receiving holes.

First, the first outer part 112A having therein the first to fourth guide support holes GH1 to GH4 is prepared, and the guide members G1 to G4 are engaged in the first to fourth guide support holes GH1 to GH4, respectively. As such, the first to fourth guide support holes GH1 to GH4 serve to receive and support the guide members G1 to G4. Accordingly, each of the first to fourth guide support holes GH1 to GH4 may be a blind hole, or may be a through-hole extending in the first direction, as shown in the drawings.

Although the number of guide members G1 to G4 is illustrated as being four, the embodiment is not limited as to the specific number of guide members G1 to G4. The number of guide members G1 to G4 may be three or less, or may be five or more.

Thereafter, a plurality of unit cells 122-1 to 122-N is stacked in the first direction while being guided by the first to fourth guide members G1 to G4. In the process of stacking the plurality of unit cells, the unit cells may swell in the second and third directions, intersecting the first direction. In order to prevent this, rigid members (not shown) may be fitted into recesses 402, 412 and 422 in the first to fourth guide members G1 to G4. That is, the rigid members fitted in the recesses 402, 412 and 422 may prevent the plurality of unit cells from swelling in the second and third directions, intersecting the first direction, in the process of stacking the plurality of unit cells.

Thereafter, a second end plate 110B is stacked on the last unit cell 122-N, among the plurality of unit cells 122-1 to 122-N. In order to uniformly align the plurality of unit cells 122-1 to 122-N in the first direction in the process of stacking the plurality of unit cells 122-1 to 122-N, notch lines NL1 and NL2 are used. The notch lines NL1 and NL2 serve as reference lines along which the plurality of unit cells is stacked. The guide members may be aligned with the notch lines NL1 and NL2.

Thereafter, the plurality of unit cells 122-1 to 122-N stacked between the first and second end plates 110A and 110B is pressed.

Thereafter, the guide members G1 to G4 are removed, and the enclosure 300A is engaged with the first and second end plates 110A and 110B.

Referring to FIG. 2, the first to fourth guide support holes GH1 to GH4 may be formed in the edge of the first outer part 112A. At least a portion of each of the first to fourth guide support holes GH1 to GH4 may overlap a respective one of the receiving recesses H1 and H2 formed in the first inner part 114A in the first direction. That is, the first guide support hole GH1 may overlap one of the 1-1$^{st}$ receiving recesses H1 formed in the first inner part 114A in the first direction, the second guide support hole GH2 may overlap the other one of the 1-1$^{st}$ receiving recesses H1 formed in the first inner part 114A in the first direction, the third guide support hole GH3 may overlap one of the 1-2$^{nd}$ receiving recesses H2 formed in the first inner part 114A in the first direction, and the fourth guide support hole GH4 may overlap the other one of the 1-2$^{nd}$ receiving recesses H2 formed in the first inner part 114A in the first direction.

The fifth to eighth guide support holes GH5 to GH8 may be formed in the edge of the second outer part 112B. Each of the fifth to eighth guide support holes GH5 to GH8 may overlap a respective one of the second receiving recesses formed in the second inner part 114B in the first direction.

The plurality of guide support holes GH1 to GH8 may be located on imaginary extension lines extending in the first direction from the notch lines NL1 and NL2 marked on the cell stack 122.

For example, referring to FIG. 2, the plurality of guide support holes GH1 and GH5 may be located on the first imaginary extension line ① extending in the first direction from the first notch line NL1 marked on the cell stack 122. The plurality of guide support holes GH2 and GH6 may be located on the second imaginary extension line ② extending in the first direction from the second notch line NL2 marked on the cell stack 122. The plurality of guide support holes GH3 and GH7 may be located on the third imaginary extension line ③ extending in the first direction from the third notch line (not shown) marked on the cell stack 122. The plurality of guide support holes GH4 and GH8 may be located on the fourth imaginary extension line ④ extending in the first direction from the fourth notch line (not shown) marked on the cell stack 122.

It can be seen that the first to fourth extension lines ①, ②, ③ and ④ described above pass through the respective receiving recesses.

Referring to FIGS. 4, 6, 9A and 9B, in the case in which the protruding portions P are inserted into the receiving recesses H in the third direction, each of the first to eighth guide support holes GH1 to GH8 has a first width W1 in the second direction, intersecting the first and third directions, each of the receiving recesses H (H1 and H2) has a second width W2 in the second direction, and each of the protruding portions P has a third width W3 in the second direction. The relationships between the first to third widths W1, W2 and W3 are expressed using Equation 2 below:

$$W1 < W2 \le W3 \quad \text{[Equation 2]}$$

The fuel cell 1000A or 1000B according to the embodiment may include one cell stack 122, as described above. Unlike the configuration described above, the fuel cell 1000A or 1000B may include two cell stacks, which are stacked vertically in the third direction, which is perpendicular to the first direction in which the unit cells are stacked. The fuel cell according to the embodiment including two cell stacks may further include a manifold block for controlling the flow of fluid toward the two cell stacks. In this case, the manifold block may be mounted to the outer side of the second end plate 110B shown in FIG. 1.

Hereinafter, a fuel cell according to a comparative example and the fuel cell according to an embodiment will be described with reference to the accompanying drawings.

Figure 11:
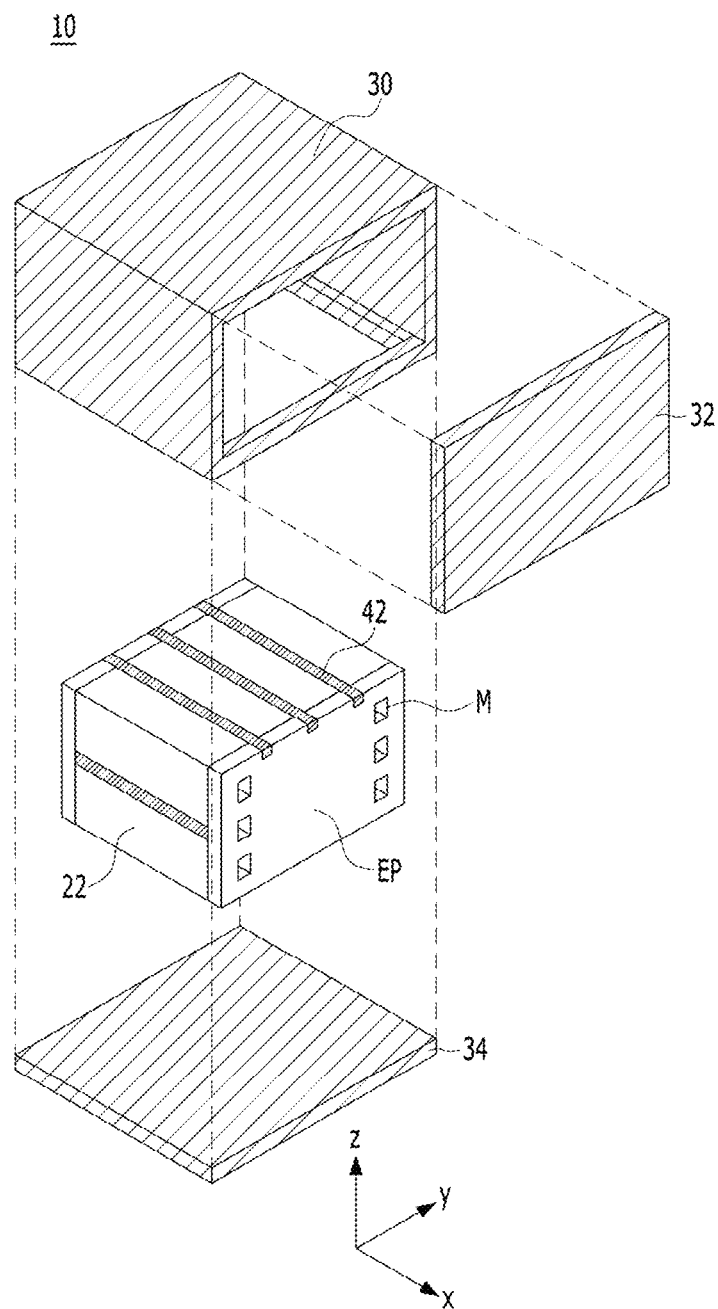
FIG. 11 is an exploded perspective view of a fuel cell according to a comparative example.

FIG. 11 is an exploded perspective view of a fuel cell 10 according to a comparative example.

The fuel cell 10 according to the comparative example shown in FIG. 11 includes an enclosure 30, 32 and 34 and a power generator. The enclosure 30, 32 and 34 is composed of an upper cover 30, a side cover 32, and a lower cover 34, and serves to protect the power generator from the outside of the fuel cell 10.

The power generator includes a cell stack 22, end plates EP disposed on both sides of the cell stack 22, and a clamping bar 42. In FIG. 11, the cell stack 22 may perform the same role as the cell stack 122 shown in FIG. 3, and the end plates EP may perform the same role as the end plates 112A and 112B according to an embodiment, and may include a manifold M.

The cell stack 22, in which a plurality of unit cells is stacked, is placed between the end plates EP. Thereafter, a clamping load is applied to the cell stack 22 to compress the same. In the compressed state of the cell stack 22, the clamping bar 42 is fitted onto the cell stack 22, and a bolt is fastened into the clamping bar 42, thereby maintaining the force that clamps the cell stack 22 disposed in the space between the end plates EP and maintains the compressed state thereof.

Unlike the configuration shown in FIG. 11, in the case in which the fuel cell 10 according to the comparative example includes two cell stacks stacked in the third direction, perpendicular to the first direction in which the unit cells are stacked, the fuel cell 10 may further include a manifold block for controlling the flow of fluid toward the two cell stacks. In this fuel cell according to the comparative example, the manifold block and the enclosure, which are assembled so as to envelop the cell stack, serve to secure the inflow/outflow of a reactant gas and a coolant into/from the cell stack 22 and the insulation and watertightness of the cell stack 22 and to protect the cell stack 22.

In the case of the comparative example, the pressure by which the cell stack 22 is clamped may be maintained by the end plates EP and the clamping bar 42, and the resistance of the fuel cell 10 to entry of water and dust from the outside may be maintained by a gasket disposed between the upper cover 30 and the side cover 32 of the enclosure and a gasket disposed between the upper cover 30 of the enclosure and the manifold block.

However, in the case of the fuel cell 10 according to the comparative example having the configuration described above, the clamping bar 42 is required to maintain the force that clamps the cell stack 22, and the upper cover 30 and the side cover 32 of the enclosure need to be engaged with each other in order to secure airtightness, watertightness, and resistance to dust, thus making the configuration complicated. That is, in order to protect the power generator from the outside, the upper cover 30, the side cover 32 and the lower cover 34 of the enclosure need to be sealed using gaskets in a form that surrounds the outer periphery of the power generator, thus increasing both the size of the fuel cell and stack assembly tolerance.

On the other hand, in the case of the fuel cell according to an embodiment, the force that clamps the cell stack 122 may be maintained by engaging the first and second end plates 110A and 110B with the enclosure 300A using the first and second coupling portions C1 and C2 and the fastener F2, rather than using a separate clamping bar 42. In addition, in the case of the fuel cell according to an embodiment, the end plates may serve as the side cover 32, and the first and second outer gaskets 116A and 116B, which secure the resistance of the fuel cell to entry of water and dust from the outside, may be disposed on the peripheral portions of the first and second inner parts 114A and 114B.

As described above, in the case of the fuel cell according to an embodiment, the structure for clamping the cell stack and the structure for securing airtightness and resistance to water and dust are integrated. Accordingly, compared to the fuel cell according to the comparative example, the fuel cell according to an embodiment is advantageous in that the number of components is reduced, the weight thereof is reduced, and the manufacturing process thereof is simplified.

In addition, the outer parts 112A and 112B are made of a metal material so as to secure rigidity required for the end plates 110A and 110B, and the first and second inner parts 114A and 114B, in which the receiving recesses are formed to receive the protruding portions of the enclosure 300A made of a metal material, are made of an insulating material, thereby increasing the engagement force between the first and second inner parts 114A and 114B and the plurality of protruding portions of the enclosure 300A.

In addition, in the case of an embodiment, the first and second inner parts 114A and 114B and the first and second outer gaskets 116A and 116B are made of the same material so as to be integrated with each other, and the second shells S2 of the first and second outer parts 112A and 112B and the first and second outer gaskets 116A and 116B are made of the same material so as to be integrated with each other, thereby reducing the overall size of the fuel cell and exhibiting excellent watertightness, airtightness, and dustproofness.

In addition, since the guide support holes GH1 to GH8, into which the guide members G1 to G8 are fitted, are located on the notch lines NL1 and NL2 and the extension lines ①, ②, ③ and ④, the degree of alignment of the cell stack 122 may be improved.

As is apparent from the above description, according to a fuel cell of an embodiment, the number of components is reduced, the weight thereof is reduced, the manufacturing process thereof is simplified, the watertightness, airtightness and dustproofness thereof are improved, and the accuracy of alignment of a cell stack is improved.

The above-described various embodiments may be combined with each other without departing from the objects of the present disclosure unless they are contrary to each other. In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
    a cell stack including a plurality of unit cells stacked in a first direction;
    a first end plate and a second end plate disposed at respective side ends of the cell stack;
    an enclosure coupled to at least one of the first end plate or the second end plate to envelop a side portion of the cell stack; and
    an outer gasket disposed between the at least one of the first end plate or the second end plate and the enclosure,
    wherein an end portion of the enclosure comprises at least one protruding portion protruding toward an end plate to which the enclosure is coupled, among the first end plate and the second end plate;
    wherein the end plate coupled to the enclosure comprises at least one receiving recess formed therein to receive the at least one protruding portion;
    wherein the end plate coupled to the enclosure comprises an outer part and an inner part disposed between an outermost cell of the cell stack and an inner surface of the outer part in the first direction;
    wherein the at least one receiving recess is formed in an edge of the inner part, and
    wherein the outer gasket is disposed between the inner surface of the outer part of the end plate and the enclosure.

2. The fuel cell according to claim 1, wherein the end portion of the enclosure comprises:
    a first end portion coupled to the first end plate; and
    a second end portion coupled to the second end plate;
    wherein the at least one protruding portion comprises at least one of:
    a first protruding portion protruding toward the first end plate and formed in the first end portion; or
    a second protruding portion protruding toward the second end plate and formed in the second end portion; and
    wherein the at least one receiving recess comprises at least one of:

a first receiving recess formed in the first end plate to receive the first protruding portion; or a second receiving recess formed in the second end plate to receive the second protruding portion.

3. The fuel cell according to claim 1, wherein the enclosure is divided into a plurality of segments, and wherein the at least one protruding portion protrudes from an end portion of at least one of the plurality of segments.

4. The fuel cell according to claim 1, wherein the end portion of the enclosure comprises:

first and second side portions disposed opposite each other in a second direction, intersecting the first direction; and an upper portion and a lower portion disposed opposite each other in a third direction, intersecting the first direction and the second direction, wherein the at least one protruding portion protrudes from at least one of the upper portion, the lower portion, the first side portion, or the second side portion.

5. The fuel cell according to claim 1, wherein a length of the enclosure in the first direction is less than an interval by which an inner surface of the outer part of the first end plate and an inner surface of the outer part of the second end plate are spaced apart from each other in the first direction.

6. The fuel cell according to claim 1, wherein the outer gasket is disposed on the inner surface of the outer part that faces an outer surface of the enclosure in the first direction.

7. The fuel cell according to claim 6, wherein the inner surface of the outer part comprises a first recess formed therein to allow the outer gasket to be inserted thereinto.

8. The fuel cell according to claim 1, wherein the outer gasket is disposed on an outer surface of the enclosure that faces the inner surface of the outer part in the first direction.

9. The fuel cell according to claim 8, wherein the outer surface of the enclosure comprises a second recess formed therein to allow the outer gasket to be inserted thereinto.

10. The fuel cell according to claim 1, wherein the outer gasket is disposed in contact with an edge of the inner part.

11. The fuel cell according to claim 1, wherein the outer gasket is disposed so as to be spaced apart from an edge of the inner part.

12. The fuel cell according to claim 1, wherein each of the outer part and the inner part comprises a metal, and wherein the outer part and the inner part are integrated.

13. The fuel cell according to claim 1, wherein the outer part comprises a metal and the inner part comprises an insulating material.

14. The fuel cell according to claim 13, wherein the outer part comprises:

a body comprising a metal, the body comprising an outer surface and an inner surface facing the inner part; and a shell disposed on at least one of the outer surface or the inner surface of the body, the shell being insulative, wherein the outer gasket is integrated with at least one of the shell or the inner part.

15. The fuel cell according to claim 1, further comprising:

a fastener, wherein the outer part comprises a first coupling portion, wherein the enclosure comprises a second coupling portion configured to be engaged with the first coupling portion by the fastener, and wherein a clamping force of the cell stack is increased in the first direction by an engagement force of the first coupling portion and the second coupling portion.

16. A fuel cell, comprising:

a cell stack including a plurality of unit cells stacked in a first direction;

a first end plate and a second end plate disposed at respective side ends of the cell stack;

an enclosure coupled to at least one of the first end plate or the second end plate to envelop a side portion of the cell stack; and an outer gasket disposed between the at least one of the first end plate or the second end plate and the enclosure, wherein an end portion of the enclosure comprises at least one protruding portion protruding toward an end plate to which the enclosure is coupled, among the first end plate and the second end plate;

wherein the end plate coupled to the enclosure comprises at least one receiving recess formed therein to receive the at least one protruding portion;

wherein the end plate coupled to the enclosure comprises an outer part and an inner part disposed between an outermost cell of the cell stack and an inner surface of the outer part in the first direction;

wherein the at least one receiving recess is formed in an edge of the inner part;

wherein the outer gasket is disposed between the inner surface of the outer part of the end plate and the enclosure; and wherein the outer part comprises at least one guide support hole formed in an edge of the outer part so as to overlap the at least one receiving recess in the first direction.

17. The fuel cell according to claim 16, wherein:

the at least one guide support hole has a first width in a second direction, intersecting the first direction;

the at least one receiving recess has a second width in the second direction;

the at least one protruding portion has a third width in the second direction; and the first to third widths have relationships therebetween as W1<W2≤W3, where W1 represents the first width, W2 represents the second width, and W3 represents the third width.

18. The fuel cell according to claim 16, wherein the enclosure is divided into a plurality of segments, and wherein the at least one protruding portion protrudes from an end portion of at least one of the plurality of segments.

19. The fuel cell according to claim 16, wherein the end portion of the enclosure comprises:

first and second side portions disposed opposite each other in a second direction, intersecting the first direction; and an upper portion and a lower portion disposed opposite each other in a third direction intersecting the first direction and the second direction, wherein the at least one protruding portion protrudes from at least one of the upper portion, the lower portion, the first side portion, or the second side portion.

* * * * *